July 1, 1969  E. J. HARMON  3,452,845
BRAKE DISC AND BALANCING WEIGHT
Original Filed Jan. 4, 1967
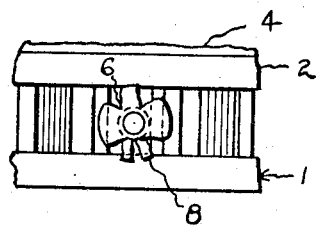
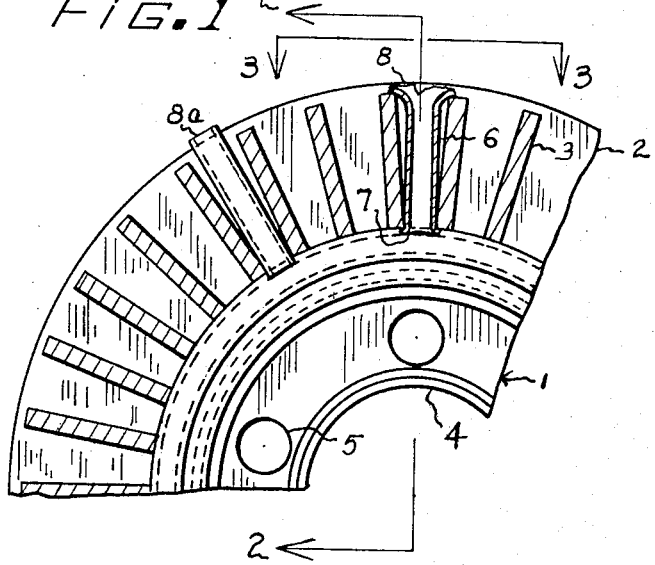
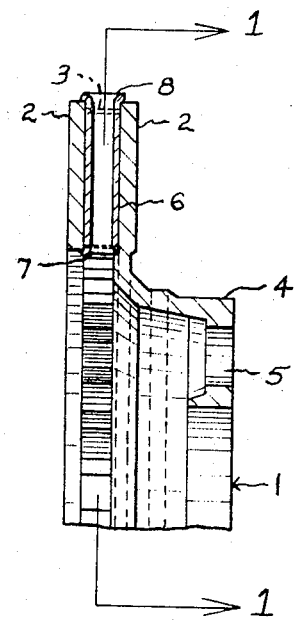
INVENTOR
EDWARD J. HARMON
BY
Allan J. Murray
ATTORNEY

United States Patent Office 3,452,845
Patented July 1, 1969

3,452,845
BRAKE DISC AND BALANCING WEIGHT
Edward J. Harmon, Detroit, Mich., assignor to Micropoise Engineering and Sales Company, Detroit, Mich.
Continuation of application Ser. No. 607,318, Jan. 4, 1967. This application Mar. 15, 1968, Ser. No. 713,541
Int. Cl. F16d 55/00; F16f 15/28, 15/32
U.S. Cl. 188—218          6 Claims

ABSTRACT OF THE DISCLOSURE
A brake disc, with a weight applied thereto, to correct predetermined imbalance of the disc.

---

This application is a continuation of application Ser. No. 607,318, filed Jan. 4, 1967, now abandoned.

Summary of invention

This invention relates to the combination of balancing weights and brake disc, and particularly to such discs as include spaced, annular flanges, concentric about a mutual axis of rotation and being interconnected by a plurality of spaced-apart webs extending therebetween.

An object of the invention is to balance a brake disc by inserting between appropriately disposed pairs of webs an elongated weight-member of predetermined length and weight.

A further object is to adapt said weight to resist escape thereof from between said webs.

A further object is to effect said adaptation by employing a weight having hollow end portions, and forming said end portions to engage portions of said brake disc to resist such escape.

Still a further object is to form said hollow end portions to engage surfaces of said webs.

A further object is to form said hollow end portions to engage the outer circumferential surface of at least one of said flanges.

Still a further object is to form said hollow ends of said weight to respectively engage at least one inner and outer circumferential surface of at least one of said annular flanges.

These and various other objects are attained by the construction hereinafter described and illustrated in the accompanying drawing, wherein:

FIG. 1 portrays a partial sectional elevational view of a conventional annular brake disc taken on line 1—1 of FIG. 2.

FIG. 2 portrays a partial sectional elevational view of such a brake disc taken on line 2—2 of FIG. 1.

FIG. 3 is a partial view taken on line 3—3 of FIG. 1 showing a portion of said annular flanges and of said webbing.

In these views the reference character 1 designates generally the brake disc, which is formed with two spaced, annular flanges, concentric about a mutual axis of rotation, and radially co-extensive from said axis. Said flanges are integrally interconnected by a plurality of webs 3 which may be elongated approximately radially to said axis.

From one of said flanges, there integrally extends a mounting hub 4, said hub having formed therein holes 5 to receive fastening members whereby the brake may be mounted as required by the particular construction shown.

The disc shown in the drawings is of conventional form, and it is thought unnecessary to disclose any particular form of mounting said disc. As is frequently the case in the manufacture of annular objects, such as the brake disc shown, the process of manufacture results in a product having an imbalance greater than permissible tolerances may allow. In the past, various methods of overcoming this imbalance have been practiced, such as, for example, the removal of material from a predetermined heavy area of imbalance, or the addition of material to a predetermined light area produced by said imbalance to bring the balance of the object within acceptable tolerances. In the present construction, the webs 3 play an important part in affording a flow of air therebetween, to assist in the dissipation of heat generated when the brake is employed. It is important, therefore, that any means of correcting imbalance should be employed in such a manner as to have a minimum retarding effect on the flow of air, and the consequent dissipation of heat, from any of such webs.

In the present improvement, imbalance of the brake disc is corrected by the addition of a weight to the lighter area resulting from imbalance. As disclosed, said weight 6 is preferably tubular in form and is inserted between a pair of pre-selected ribs 3 in the appropriate area to produce an acceptable balance in the brake disc. As shown in FIG. 1, said tubular member, designated as 6a, could escape from between said webs either inwardly or outwardly of the construction unless a provision is made to resist such escape.

Therefore, it being undesirable to add further to the weight, it is preferred to form the inner end 7 so that the walls of the tubular member engage the inner end surfaces of the webs 3 whereby outward escape, along the longitudinal axis of said weight, is resisted. Inward escape of the weight from between the said webs is equally undesirable, and consequently, as indicated at 8, the outer end portion of said weight is also formed to engage the outer surfaces of said webs, and may further be formed, if desired, to engage the outer circumferential faces of the flanges 2.

The inner end portion of said tubing, as shown in FIG. 1, may be formed to engage the inner circumferential face of the outer flange 2.

The present invention is believed to have several advantages over current practices in the art, in that the tubing can be cut at any desired length from any desired stock diameter, and, as aforesaid, where the passage of air through all of the spaces between the webs is important to the dissipation of heat, said tubing affords a maximum passage of air. Further, substantial control is afforded over the amount of weight to be applied, as the tubing may be obtained in several wall-thicknesses.

Finally, it is to be noted that no annular brake shoes are disclosed. Again, the reason is that brake disc such as that shown are conventional, as are the braking means applicable thereto, and it is thought unnecessary to disclose all of the details of such brake.

What I claim is:

1. The combination with a brake disc having spaced, annular flanges, concentric for rotation about a mutual axis, and interconnected by a plurality of spaced-apart webs having inner and outer end faces, of at least one balancing weight applied to said brake disc to compensate for predetermined imbalance in said brake disc, wherein the improvement comprises
    insertion between pre-selected webs of an elongated annular weight, said weight being adapted to engage portions of the brake disc to resist escape from between said webs toward or from said axis.

2. The combination as set forth in claim 1, said weight having a hollow end portion formed to engage portions of said brake disc to resist such escape in one direction along the longitudinal axis of said weight.

3. The combination as set forth in claim 1, said elongated weight having both end portions hollow and formed to engage portions of said brake disc to resist such escape in either direction of said longitudinal axis.

4. The combination as set forth in claim 3, said weight being hollow throughout its length to afford maximum passage of air therethrough.

5. The combination as set forth in claim 3, said webs occupying a position substantially radial to said axis of rotation,
    said end portions of said hollow weight being formed to engage respectively the outer and inner end faces of said webs.

6. The combination as set forth in claim 5, the outer end portion of said weight being formed to engage the outer circumferential surface of at least one of said annular flanges,
    the inner end portion of said weight being formed to engage the inner circumferential face of at least one of said annular flanges.

References Cited

UNITED STATES PATENTS 3,292,746  12/1966  Robinette.
3,366,202  1/1968  James.

GEORGE E. A. HALVOSA, *Primary Examiner.*

U.S. Cl. X.R.

74—573